US012673628B2

(12) United States Patent
King

(10) Patent No.: US 12,673,628 B2
(45) Date of Patent: Jul. 7, 2026

(54) REFRIGERATED TRAILER DOOR PROTECTOR

(71) Applicant: Haulin' Hooves, LLC, Purcell, OK (US)

(72) Inventor: Aaron King, Purcell, OK (US)

(73) Assignee: Haulin' Hooves, LLC, Purcell, OK (US)

( * ) Notice: Subject to any disclaimer, the term of this patent is extended or adjusted under 35 U.S.C. 154(b) by 0 days.

(21) Appl. No.: 18/679,831

(22) Filed: May 31, 2024

(65) Prior Publication Data

US 2024/0317168 A1 Sep. 26, 2024

Related U.S. Application Data

(63) Continuation of application No. 17/853,751, filed on Jun. 29, 2022, now Pat. No. 11,999,310.

(60) Provisional application No. 63/221,202, filed on Jul. 13, 2021.

(51) Int. Cl.
| | |
|---|---|
| *B60R 19/56* | (2006.01) |
| *B60H 1/32* | (2006.01) |
| *B60R 19/02* | (2006.01) |
| *B60R 19/04* | (2006.01) |
| *B60R 19/12* | (2006.01) |
| *H02K 5/04* | (2006.01) |

(52) U.S. Cl.
CPC .......... *B60R 19/56* (2013.01); *B60H 1/3232* (2013.01); *B60R 2019/026* (2013.01); *B60R 19/04* (2013.01); *B60R 19/12* (2013.01); *H02K 5/04* (2013.01)

(58) Field of Classification Search
CPC ......... B60R 19/56; B60R 19/04; B60R 19/12; B60R 2019/026; B60H 132/32; B60H 1/3232; F16M 1/00; H02K 5/00; H02K 5/04; B60P 3/20
See application file for complete search history.

(56) References Cited

U.S. PATENT DOCUMENTS

| | | | |
|---|---|---|---|
| 1,458,276 A | 6/1923 | Cox | |
| 1,476,382 A | 12/1923 | Turner et al. | |
| 1,547,013 A | 7/1925 | Asner | |
| 1,566,743 A | 12/1925 | Galassi | |
| 1,579,522 A * | 4/1926 | Girl | B60R 19/26 293/115 |
| 1,617,716 A * | 2/1927 | Laher | B60R 19/285 293/146 |
| 1,674,031 A * | 6/1928 | Burandt | B60R 19/023 293/122 |
| 2,081,586 A * | 5/1937 | Jandus | B60R 19/04 293/146 |
| 3,797,879 A * | 3/1974 | Edwards | B62D 35/001 105/1.1 |
| 3,977,716 A * | 8/1976 | Whited | B62D 35/001 105/1.1 |
| 4,310,192 A | 1/1982 | Fitzgerald | |

(Continued)

*Primary Examiner* — Joseph M Rocca
(74) *Attorney, Agent, or Firm* — Gregory Perrone

(57) ABSTRACT

A refrigeration trailer condenser protection apparatus having a pair of front rails with connection rods disposed thereon for connecting a street side bracket and a curb side bracket, the street side bracket and curb side bracket having mounting holes for mounting the protection apparatus to a lower side of the condenser unit.

13 Claims, 10 Drawing Sheets

(56)                  References Cited

U.S. PATENT DOCUMENTS

| | | | | |
|---|---|---|---|---|
| 6,042,162 | A * | 3/2000 | Kiefer | B60R 19/02 |
| | | | | 293/102 |
| 6,206,439 | B1 | 3/2001 | Kiefer et al. | |
| 8,157,066 | B2 | 4/2012 | Murayama et al. | |
| 9,796,343 | B2 | 10/2017 | Hare | |
| 11,999,310 | B2 * | 6/2024 | King | B60R 19/56 |
| 2015/0175108 | A1 * | 6/2015 | Kim | B60R 19/18 |
| | | | | 293/10 |

* cited by examiner

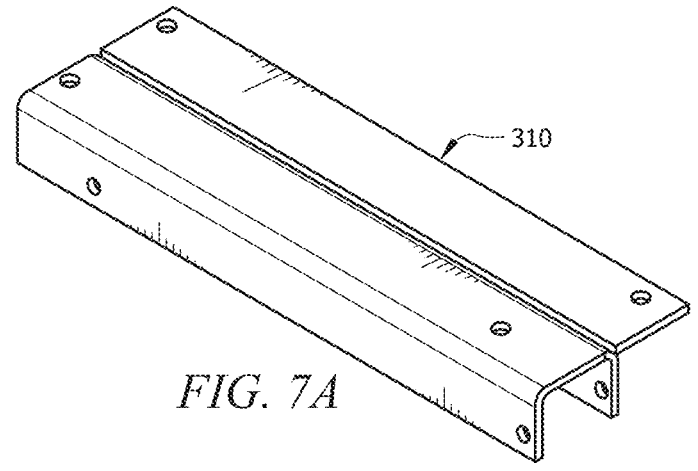
*FIG. 7A*
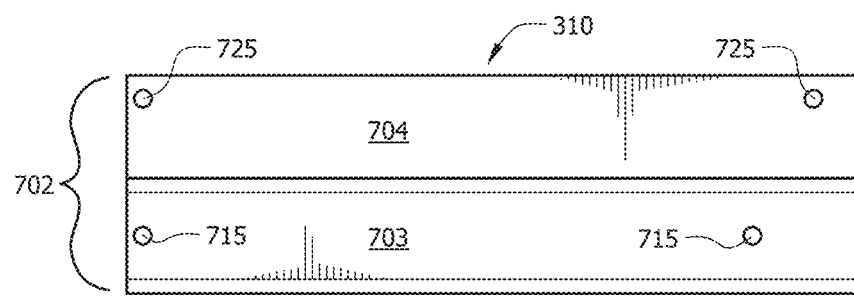
*FIG. 7B*
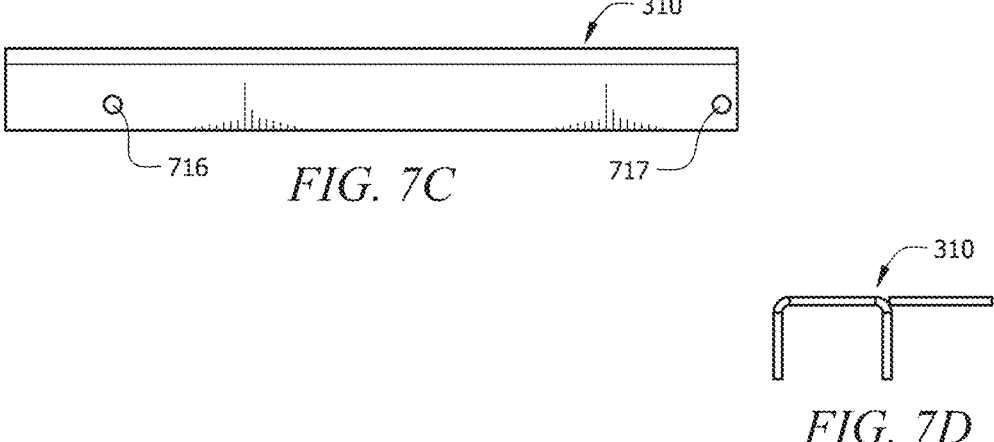
*FIG. 7C*
*FIG. 7D*

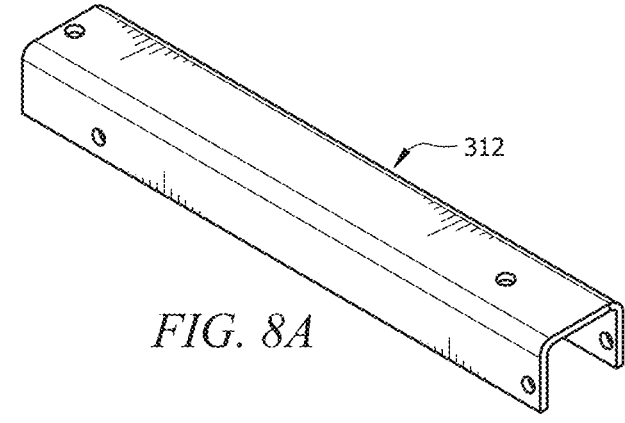
*FIG. 8A*
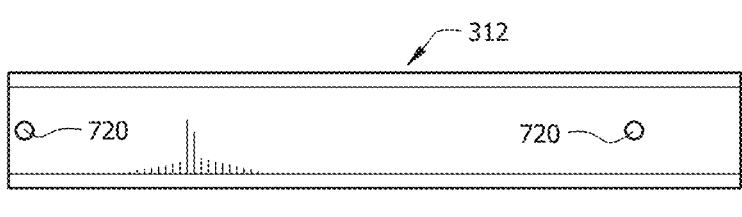
*FIG. 8B*
*FIG. 8C*
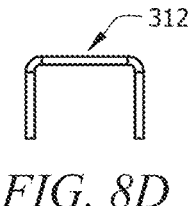
*FIG. 8D*

REFRIGERATED TRAILER DOOR PROTECTOR

CLAIM OF PRIORITY

This application claims priority to U.S. Ser. No. 17/853,751, filed on Jun. 29, 2022, which claims priority to Provisional Application No. 63/221,202 filed Jul. 13, 2021, which are incorporated by reference herein in their entirety.

TECHNICAL FIELD

This disclosure relates generally to refrigerated truck condenser units and specifically to a protection rail adaptable for connection to the condenser unit to protect the unit from damages.

BACKGROUND

Refrigerated trailers and trucks have been in use for years for transport of food and other perishable items. The refrigerated truck or trailer, also called a "reefer" trailer for short, includes a refrigeration unit to keep the trailer compartment at a desired temperature. This is similar to a common home refrigerator that includes a condenser, which is one of the main operating components of the cooling system of the reefer trailer. Commonly, the condenser unit is installed at the rear of the refrigerator. That is, on the back side of the compartment that is cooled by the unit.

The same holds true for most reefer trailers. The refrigeration unit including the condenser is commonly installed on the outside of the trailer on the side of the trailer where cool air enters the interior trailer compartment. FIG. 1 depicts a common reefer trailer 100. Trailer 100 includes refrigeration unit 102 that is situated on an exterior wall of trailer 100. In this example, the unit is placed on the side of the trailer to which a large semi-truck would be hitched to haul the trailer. This is but one example of the location of the unit. It can also be installed on the top or sides of the trailer. As shown, refrigeration unit 102 includes one or more doors 103. These doors 103 provide access to refrigeration unit 102 and the components therein, including the condenser, to permit repair and maintenance of the refrigeration equipment, as needed. The reefer truck or trailer's engine is also susceptible to damage and the protector unit described herein provides protection to the engine as well when installed in proximity to it.

FIG. 2 provides a different view of trailer 100 with refrigeration unit 102 with its two access doors 103. Refrigeration unit 102 includes underside 104. Underside 104 include pre-drilled holes and other means for fastening.

The problem with reefer trailers is that the refrigeration unit's access doors are highly susceptible to damage as they typically are the outermost part of the trailer. Accordingly, the doors regularly are dented or damaged to the point where use of the doors to maintain the interior components of the refrigeration unit are not usable. What is needed, therefore, is a protector of the doors and refrigeration unit that is universal in size and can be easily installed.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings and photographs, wherein:

FIG. 7A is a perspective view of a street side bracket according to an embodiment.

FIG. 7B is a top view of a street side bracket according to an embodiment.

FIG. 7C is a front view of a street side bracket according to an embodiment.

FIG. 7D is a cross sectional view of a street side bracket according to an embodiment.

FIG. 8A is a perspective view of a curbside bracket according to an embodiment.

FIG. 8B is a top view of a curbside bracket according to an embodiment.

FIG. 8C is a front view of a curbside bracket according to an embodiment.

FIG. 8D is a cross sectional view of a street side bracket according to an embodiment.

DETAILED DESCRIPTION OF THE EMBODIMENTS

The detailed description set forth below is intended as a description of the present embodiments of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
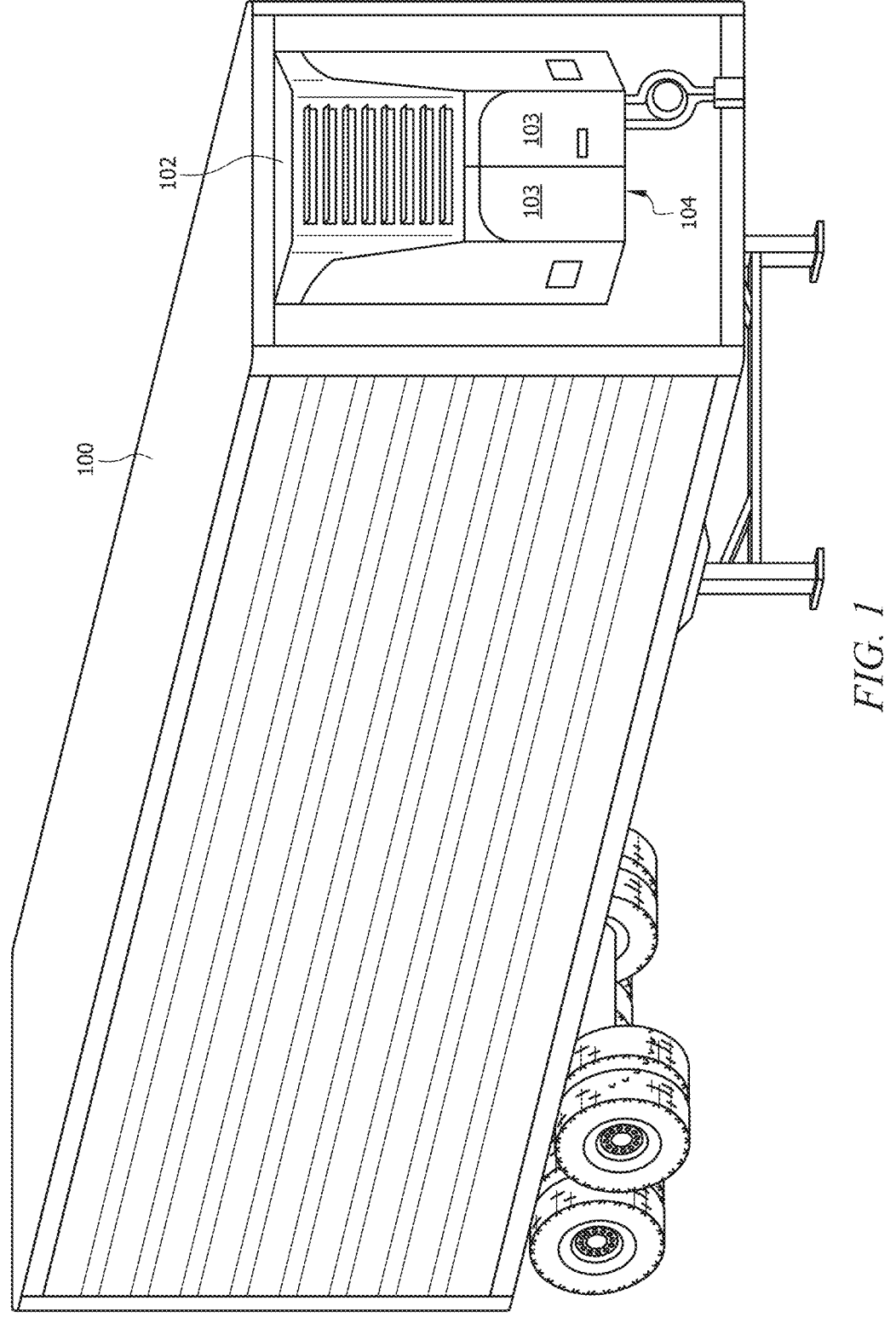
FIG. 1 depicts a perspective view of a refrigerated trailer.
Figure 2:
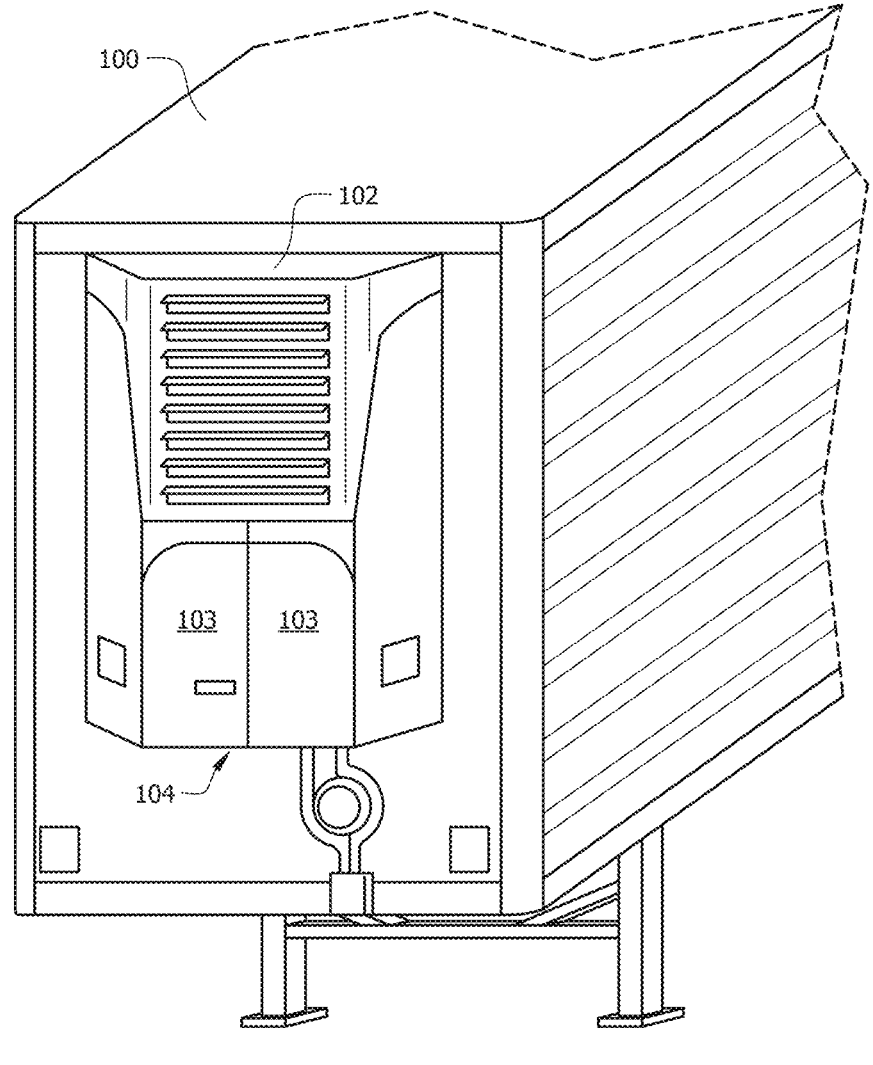
FIG. 2 depicts a perspective view of a refrigerated trailer.
Figure 3A:
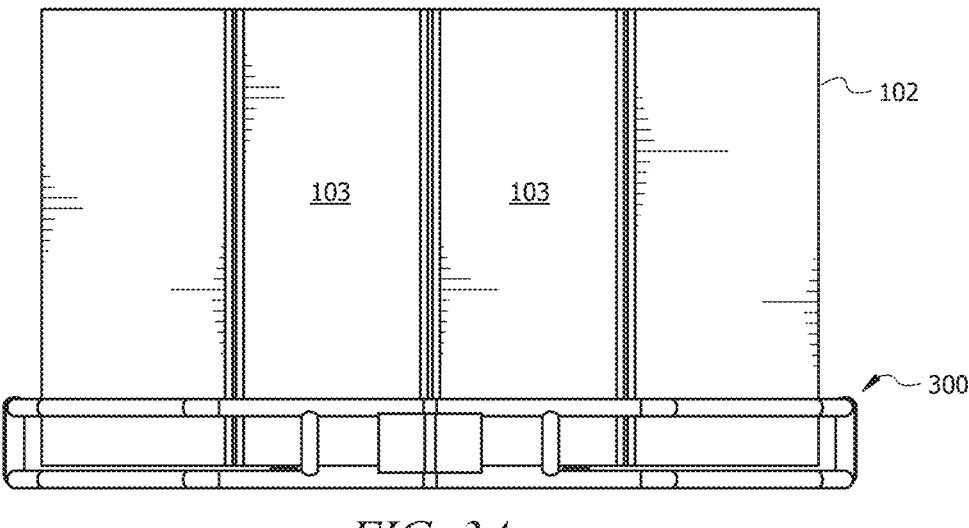
FIG. 3A is a front view of a refrigerated trailer protector according to an embodiment.
Figure 3B:
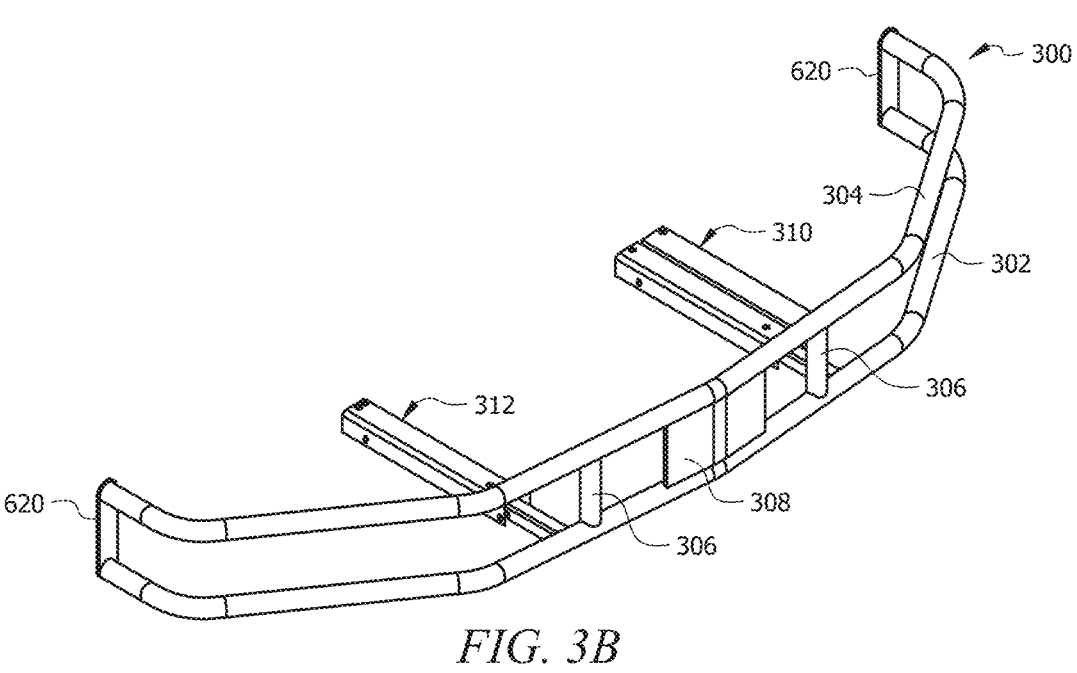
FIG. 3B is a perspective view of a refrigerated trailer protector according to an embodiment.

FIG. 3A is a front view of a refrigerated trailer protector according to an embodiment. FIG. 3B is a perspective view of a refrigerated trailer protector according to an embodiment. In FIG. 3B, an embodiment of guard 300 is shown. Guard 300 comprises a first horizontal rail 302 and a second horizontal rail 304. Each horizontal rail is bent at specific locations as described below to provide optimal protection of refrigeration unit 102 and doors 103, as shown in front view of refrigeration unit 102. As support and to connect first horizontal rail 302 and second horizontal rail 304 are vertical rails 306. As shown, there are four vertical rails 306 that are placed at various locations between first horizontal rail 302 and second horizontal rail 304 and at other locations close to the nose of guard 300 as depicted. The locations and number of vertical and horizontal rails are not limited to the number and location as shown. First horizontal rail 302 and second horizontal rail 304 are joined at their respective ends by end caps 620, which will be described in more detail below with reference to FIG. 6. Any number of these vertical members and horizontal members can be used to provide added protection without departing from the spirit and scope of the invention.

Continuing with FIG. 3B, in one embodiment, guard 300 includes bends at various points, as will be described, that results in guard 300 coming to a point at the substantial center of the front of the horizontal rails. As shown, plaque 308 is located at the point of horizontal rails 302 and 304. As shown in detail in FIG. 6, plaque 308 in one embodiment is formed by a first panel 610 and a second panel 611, joined by middle rail 309. Plaque 308 serves as an addition vertical rail providing extra support in securing first horizontal rail 302 to second horizontal rail 304. Plaque 308, with its first panel 610 and second panel 611, also serves as an advertisement board allowing users to place advertisement material on the panels as an opportunity to generate additional revenue or to promote itself.

Figures 4A, 4B:
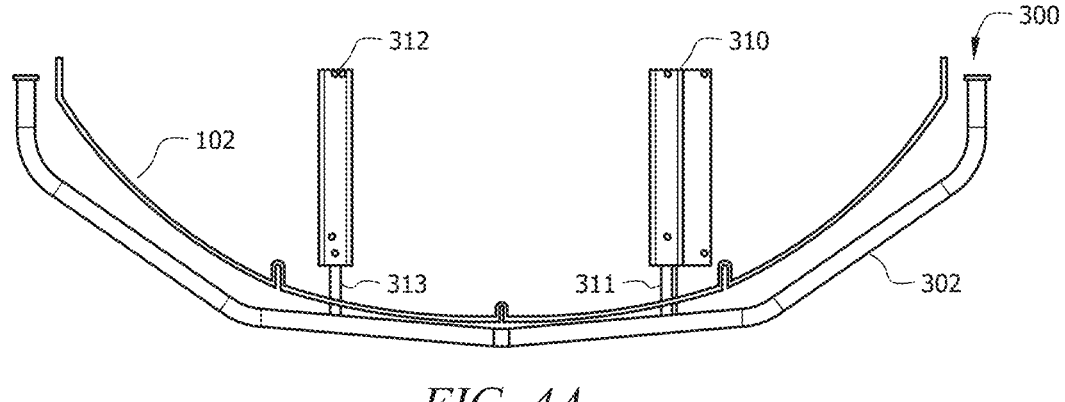
FIG. 4A is a top view of a refrigerated trailer protector according to an embodiment.
FIG. 4B is a top view of a horizontal rail of a refrigerated trailer protector according to an embodiment.

Also as shown in FIG. 3B are street side bracket 310 and curbside bracket 312. Street side bracket 310 and curb side bracket 312 in one embodiment are tubular sleeves having a rectangular cross section. As shown in FIG. 4A, street side bar 311 is received by street side bracket 310, and curb side bar 313 is received by curb side bracket 312. Each of these bars are sized in accordance with the dimension of the bracket to provide secure fitting. As will be described, street side bracket 310 and curbside bracket 312 include pilot holes and corresponding bolts for securing the brackets to underside 104 of refrigeration unit 102 and to secure the bars within the brackets. This configuration securely fastens guard to the refrigeration unit.

FIG. 4A is a top view of a refrigerated trailer protector according to an embodiment. FIG. 4B is a top view of a horizontal rail of a refrigerated trailer protector according to an embodiment. FIG. 4B depicts a series of bend points along first horizontal rail 302 and second horizontal rail 304 of guard 300. These bend points 321, 322, 323, 324 and 325 are of angles to permit extension of guard of a distance away from refrigeration unit 102 to provide optimal protection for doors 103. In one embodiment, horizontal rails 302 and 304 are bent 125 degrees from vertical at bend points 321 and 324 and at 150 degrees between rail sections at bend points 322 and 323. At bend point 325, which forms the nose of guard 300, the adjoining sections of horizontal rails are bent at 170 degrees. The length of horizontal rails determine the extent of the bend angles and location of bend points. The bend point locations and angles shown are but one of many alternative embodiments and are by no means limiting.

Figure 5A:
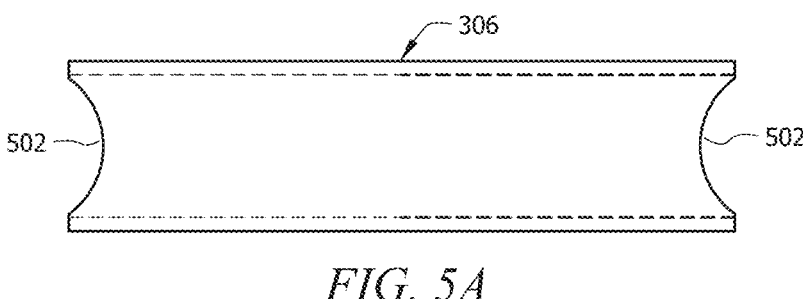
FIG. 5A provides a cross sectional view of a guard of a refrigerated trailer protector according to an embodiment.
Figure 5B:
FIG. 5B provides a side view of a guard of a refrigerated trailer protector according to an embodiment.
Figure 5C:
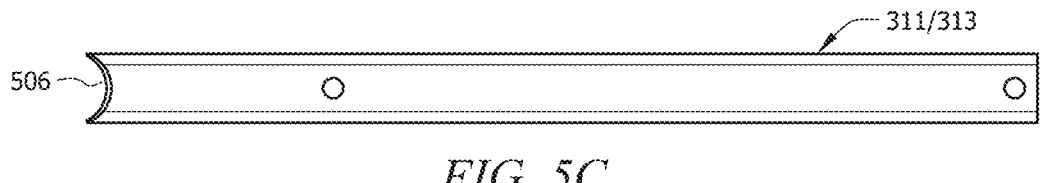
FIG. 5C provides a side view of a guard of a refrigerated trailer protector according to an embodiment.

FIGS. 5A, 5B and 5C provide close up views of various components of the guard according to an embodiment of the invention. FIG. 5A provides a cross sectional view of a guard of a refrigerated trailer protector according to an embodiment. FIG. 5B provides a side view of a guard of a refrigerated trailer protector according to an embodiment. FIG. 5C provides a side view of a guard of a refrigerated trailer protector according to an embodiment. In FIG. 5A, a close up of a vertical rail 306. As shown, in an embodiment ends 502 and 503 of vertical rail 306 interlock with horizontal rails having a square profile when vertical rails and horizontal rails are connected. In one embodiment, the pipes used to form vertical and horizontal rails are 1.25 inches in diameter and are made of schedule 40 steel. Other dimensions and materials can be used, however, to remain within the spirit and scope of the invention.

FIGS. 5B and 5C depict a close up view of bar 311/313. Bar 311/313 are elongated members having a square cross section, shaped for receipt by tubular brackets 310 and 312 as discussed above. In one embodiment, a first end 505 of bar 311/313 has an angle α of 95 degrees, for receipt into bracket 310/312. The second end 506 of bar 311/313 includes an angled cut as shown having a radius of ¹¹⁄₁₆ inch. This second end 506 of bar 311/313 meets and is secured to first horizontal rail 302. The length of bars 311/313 and the radius of the angled cut can vary according to the overall sizing of guard 300.

Figure 6A:
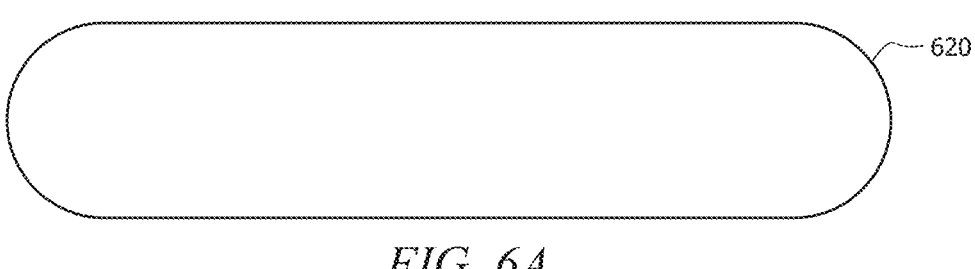
FIG. 6A provides a top view of an end cap of a refrigerated trailer protector according to an embodiment.

FIG. 6A provides a top view of an end cap of a refrigerated trailer protector according to an embodiment. FIG. 6A depicts end cap 620, which as described above joins the respective ends of first horizontal rail 302 and second horizontal rail 304. As shown, end cap 620 in one embodiment is oval in shape, with the rounded ends of end cap 620 conforming to the diameter of horizontal rails to snuggly fit over the ends of first horizontal rail 302 and second horizontal rail 304. End cap 302 is comprised of metal, plastic or other suitable material. As the end of the guard, end cap 302 serves to withstand impact to the ends of guard 300 and keep water out of the tubular structure of guard 300.

Figure 6B:
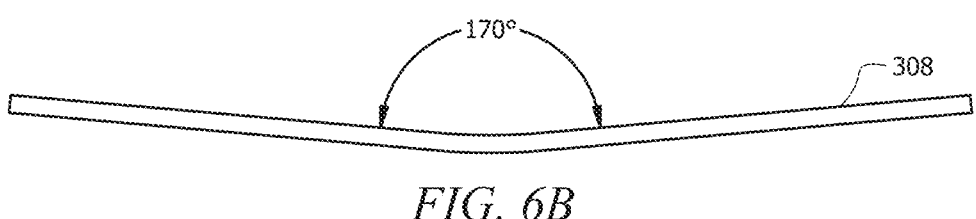
FIG. 6B provides and a top view of a guard plaque according to an embodiment.
Figure 6C:
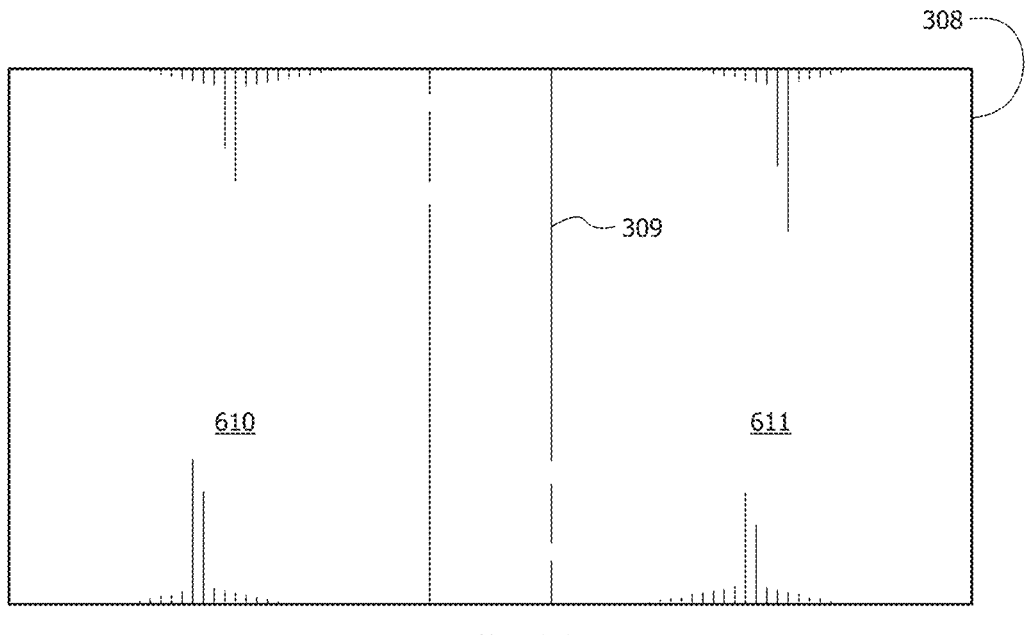
FIG. 6C provides and a front view of a guard plaque according to an embodiment.

FIG. 6B provides and a top view of a guard plaque and FIG. 6C provides and a front view of a guard plaque according to an embodiment. Plaque 308 as described above is the effective nose of guard 300. As shown from the top view, plaque 308 is a subtle v-shape having an adjoining angle of 170 degrees, although other angles can accommodate horizontal rails of different dimensions or other bend angles of different values. As discussed, first panel 610 and second panel 611 of plaque 608 serve as advertising panels on which stickers, placards, and the like are affixed. Since plaque 608 is the front-most point of guard 300 and reefer trailer 100 when no semi is hauling it, plaque 308 is in an advantageous place for placing an advertisement.

FIGS. 7A-7D provide various views of street side bracket 310 according to an embodiment of the present invention. An isometric view of street side bracket 310 and curb side bracket 312 are provided in FIG. 7A. FIG. 7B is a top view of street side bracket 310 according to an embodiment. As shown, street side bracket 310 includes a double top panel 702. A first side 703 of double top panel 702 is the full bracket for receipt of bar 311, as discussed. A second side 704 of double top panel 702 is a flat extension from the first side 703. Second side 704 provides for added security when installing guard 300 to underside 104 of refrigeration unit 102 as the surface area of the interface of street side bracket 310 is larger than the surface area of curb side bracket 312.

Also shown in FIG. 7B for street side bracket 310 are first pilot holes 715 for receiving a bolt or other suitable fastener and aligning the same in a receiving bracket located on underside 104 of refrigeration unit 102. The location of pilot holes accommodate one or several models of refrigeration unit 102 and their corresponding receiving holes for the street and curbside brackets.

FIG. 7C is a front view of street side bracket 310. As shown, the side of street side bracket 310 includes first side pilot hole 716 and second side pilot hole 717 for securing in place bar 311 that is received by street side bracket 310. In another embodiment, first side pilot hole 716 comprises a slot. Slot 716 provides some room to account for the exact location of corresponding pilot holes in bar 311. FIG. 7D is a cross sectional or end view of street side bracket 310 according to an embodiment. As shown, street side bracket 310 from the side has an inverted u-shape of the main component which is the first side 703 of the bracket and extension, which is the second side 704 of FIG. 7B. In one embodiment, the street side bracket is made of schedule 40 steel.

Similarly, FIGS. 8A-8D provide various views of curb side bracket 312. FIG. 8A is a perspective view of curb side bracket 312. FIG. 8B is a top view of curb side bracket 312, which in one embodiment is a single section having a pilot holes 720 on the top face. Pilot holes 720 are located to align with corresponding curb side holes in underside 104 of refrigeration unit 102. FIG. 8C is a front view of curb side bracket 312. As shown, the side of curb side bracket 312, like street side bracket 310, includes first curb side pilot hole 722 and second curb side pilot hole 724. In another embodiment, first curb side pilot hole 722 comprises a slot. First curb side pilot hole 722 and second curb side pilot hole 724 with appropriate fasteners secure bar 313 (FIG. 4A) that is received by curb side bracket 312 for connecting guard 300 to the underside of refrigeration unit 102. FIG. 8D provides a cross sectional or end view of curb side bracket 312. As shown, curb side bracket 312 comprises an inverted u-shape.

Note that the placement of pilot holes and slots in brackets 310 and 312 are exemplary and other locations of slots and holes and various sizes can apply without departing form the scope of the invention. Also, while the cross section of brackets 310 and 312 are rectangular, they may be of various profiles to accommodate the shape of the corresponding bar it receives or the mounting device on underside 104 of refrigeration unit 102. The depictions in FIGS. 7A-D and FIGS. 8A-8D are, therefore, by no means limiting.

Figure 8E:
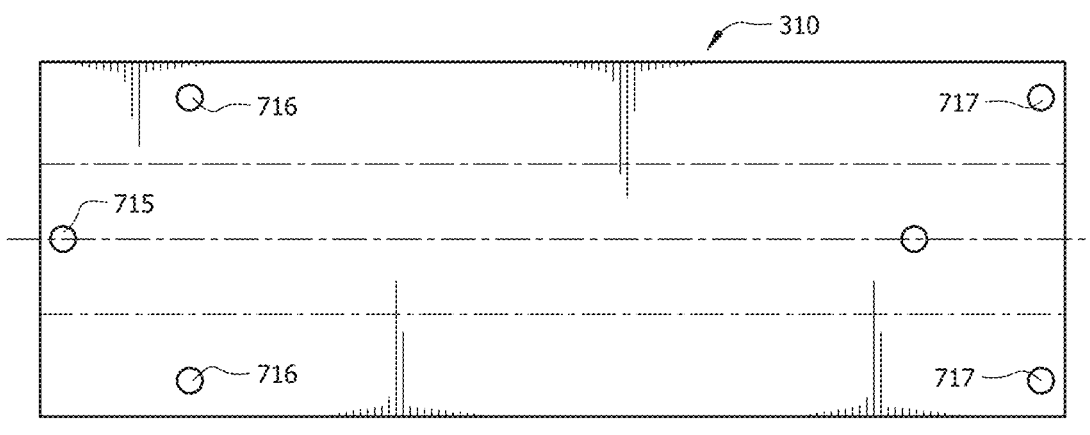
FIG. 8E depicts a top view of a pre-bent street side bracket according to an embodiment.
Figure 9A:
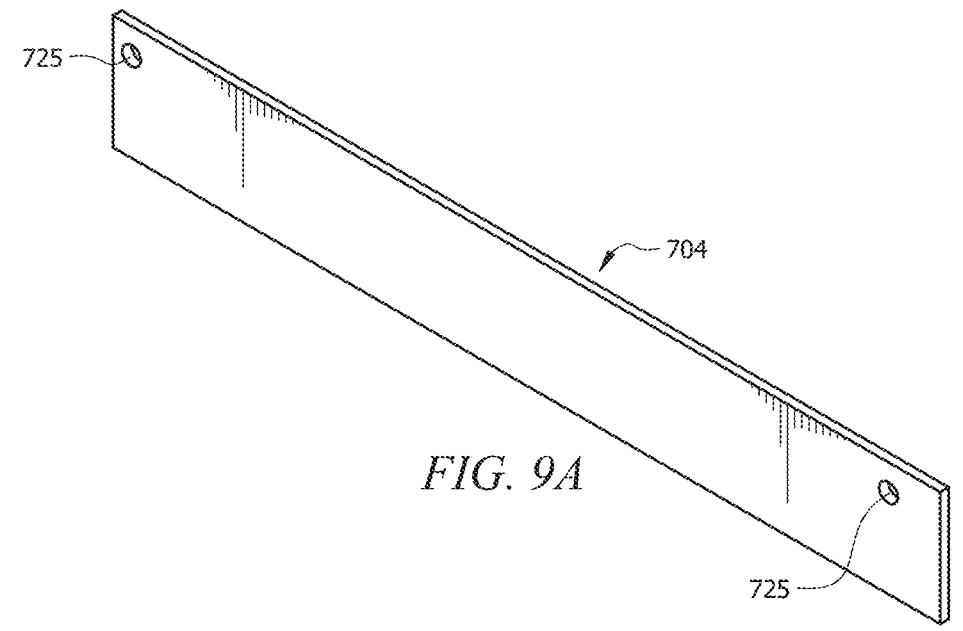
FIG. 9A depicts a perspective view of an extension of a curb side bracket to an embodiment.
Figure 9B:
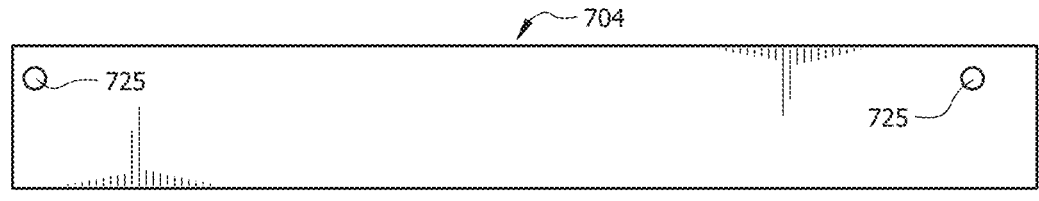
FIG. 9B depicts a front view of an extension of a curb side bracket according to an embodiment.

FIGS. 8E, 9A, 9B provide views of sheets that form street side bracket 310 according to an embodiment. In FIG. 8E, street side bracket 310 before bending comprises a sheet of material such as metal, which in one embodiment once bent will have an inverted u-shaped profile and a flat extension part 704 as shown in FIG. 7D. The dimensions of the sheet for 310 may vary as can the placement of first street side pilot holes 716 and second street side pilot holes 717. Top pilot holes 715 located in the top side of street side bracket 310 are shown in pre-bent bracket in FIG. 8E. Pilot holes 715 receive bolts or screws for securing street side bracket 310 to underside 104 of refrigeration unit 102.

Note that first street side pilot holes 716 and second street side pilot holes 717 are on each side of the pre-bent bracket 310, as shown in FIG. 8E. Also, in another embodiment, first street side pilot holes 716 are slots. FIG. 9A is a perspective view of extension part 704, with extension pilot holes 725 on each end of extension part 704. FIG. 9B is a front view of extension part 704. Extension part 704 is affixed to main inverted u-shaped part 703 by welding, adhesive, fasteners, or other suitable means.

Figure 10:
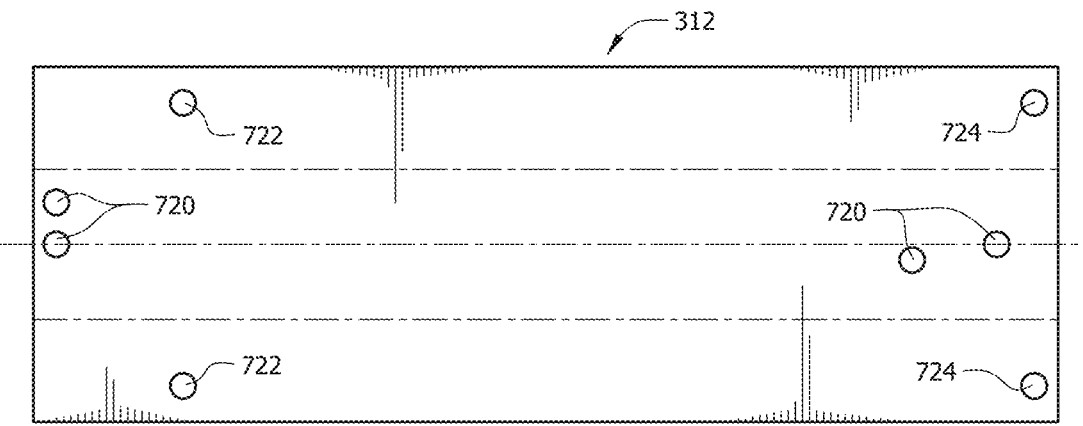
FIG. 10 depicts a top view of a pre-bent sheet of a curb side bracket according to an embodiment.

FIG. 10 is a top view of a pre-bent sheet of curb side bracket 312 according to an embodiment. Recall that in one embodiment, curb side bracket 312 is a single channel bracket in an inverted u-shape. The top side of curb side bracket 312 includes various top side pilot holes 720. These locations of pilot holes 720 accommodate various locations of corresponding mounting holes on underside 104 of refrigeration unit 102. Bolts, screws, pins or other suitable devices are inserted through top side pilot holes 720 to secure bracket 312 to refrigeration unit 102. Also shown in FIG. 9 are pairs of first curb side pilot hole 722 and second curb side pilot hole 724.

While the disclosed embodiments have been described with reference to one or more particular implementations, these implementations are not intended to limit or restrict the scope or applicability of the invention. Those having ordinary skill in the art will recognize that many modifications and alterations to the disclosed embodiments are available. Therefore, each of the foregoing embodiments and obvious variants thereof is contemplated as falling within the spirit and scope of the disclosed inventions.

While the invention has been particularly shown and described with reference to a preferred embodiment, it will be understood by those skilled in the art that various changes in form and detail can be made therein without departing from the spirit and scope of the invention.

The invention claimed is:

1. A trailer refrigeration unit protection apparatus, comprising:
   a front rail comprising an upper rail and a lower rail;
   a street side bar extending from a first interior side of the lower rail and comprising a horizontal extension bar;
   a curb side bar extended from a second interior side of the lower rail;
   a street side bracket connected to the street side bar and extending inwardly from the lower rail; and
   a curb side bracket connected to the curb side bar and extending inwardly from the lower rail; and
   a substantially v-shaped guard plaque disposed between the upper rail and the lower rail on an upper rail exterior side and a lower rail exterior side; and
   a first plurality of bent regions disposed along the length of the upper rail.

2. The trailer refrigeration unit protection apparatus of claim 1, wherein the street side bracket comprises an inverted u-shaped channel.

3. The trailer refrigeration unit protection apparatus of claim 2, further comprising a first street side bracket mounting hole on a first side of the street side bracket inverted u-shaped channel.

4. The trailer refrigeration unit protection apparatus of claim 1, wherein the curb side bracket comprises an inverted u-shaped channel.

5. The trailer refrigeration unit protection apparatus of claim 4, further comprising a second street side bracket mounting hole on a second side of the street side bracket inverted u-shaped channel.

6. The trailer refrigeration unit protection apparatus of claim 5, further comprising a third street side bracket mounting hole on the horizontal extension bar.

7. The trailer refrigeration unit protection apparatus of claim 1, wherein the upper rail comprises a first end cap and a second end cap joining the upper rail and the lower rail.

8. The trailer refrigeration unit protection apparatus of claim 1, further comprising a second plurality of bent regions disposed along the length of the lower rail.

9. The trailer refrigeration unit protection apparatus of claim 8, wherein the first plurality of bent regions is in substantial vertical alignment with the second plurality of bent regions.

10. The trailer refrigeration unit protection apparatus of claim 1, further comprising at least one vertical bar connecting the upper rail and the lower rail.

11. The trailer refrigeration unit protection apparatus of claim 1, further comprising a first curb side bracket mounting hole on a first side of the street side bracket inverted u-shaped channel.

12. The trailer refrigeration unit protection apparatus of claim 11, further comprising a second curb side bracket mounting hole on a second side of the street side bracket inverted u-shaped channel.

13. The trailer refrigeration unit protection apparatus of claim 1, wherein the street side bracket, the curb side bracket, the upper rail and the lower rail are manufactured from steel.

* * * * *